No. 762,937. PATENTED JUNE 21, 1904.
W. F. PEELER.
MACHINE FOR MAKING CEMENT BLOCKS.
APPLICATION FILED FEB. 21, 1903.
NO MODEL. 3 SHEETS—SHEET 1.

WITNESSES:
Cal Rhodes
Harris R. Brown

INVENTOR:
Warren F. Peeler
By Chester O. Brown
his Atty.

No. 762,937. PATENTED JUNE 21, 1904.
W. F. PEELER.
MACHINE FOR MAKING CEMENT BLOCKS.
APPLICATION FILED FEB. 21, 1903.
NO MODEL. 3 SHEETS—SHEET 2.
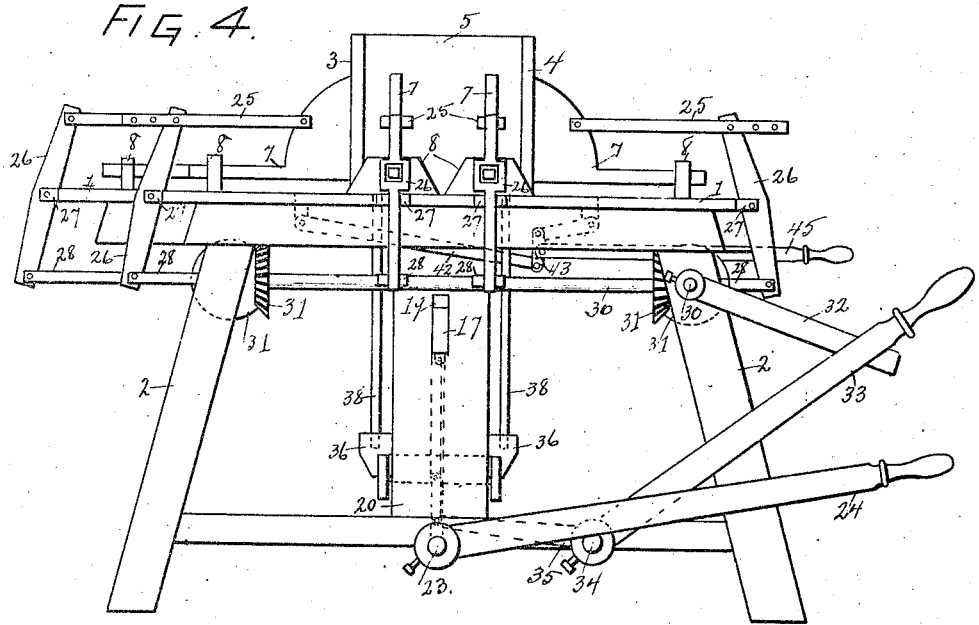
FIG. 4.
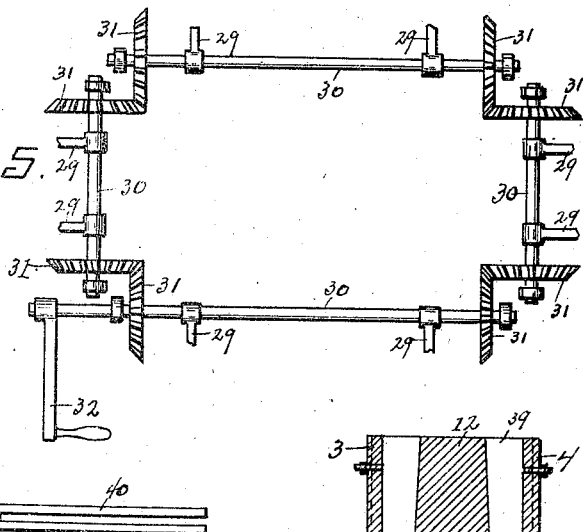
FIG. 5.
FIG. 6.
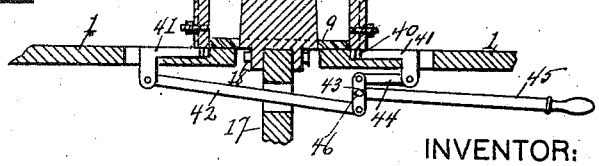
FIG. 10.
WITNESSES:
C. A. Rhodes
Harrie R. Brown.
INVENTOR:
Warren F. Peeler
By Chester W. Brown
his Atty.

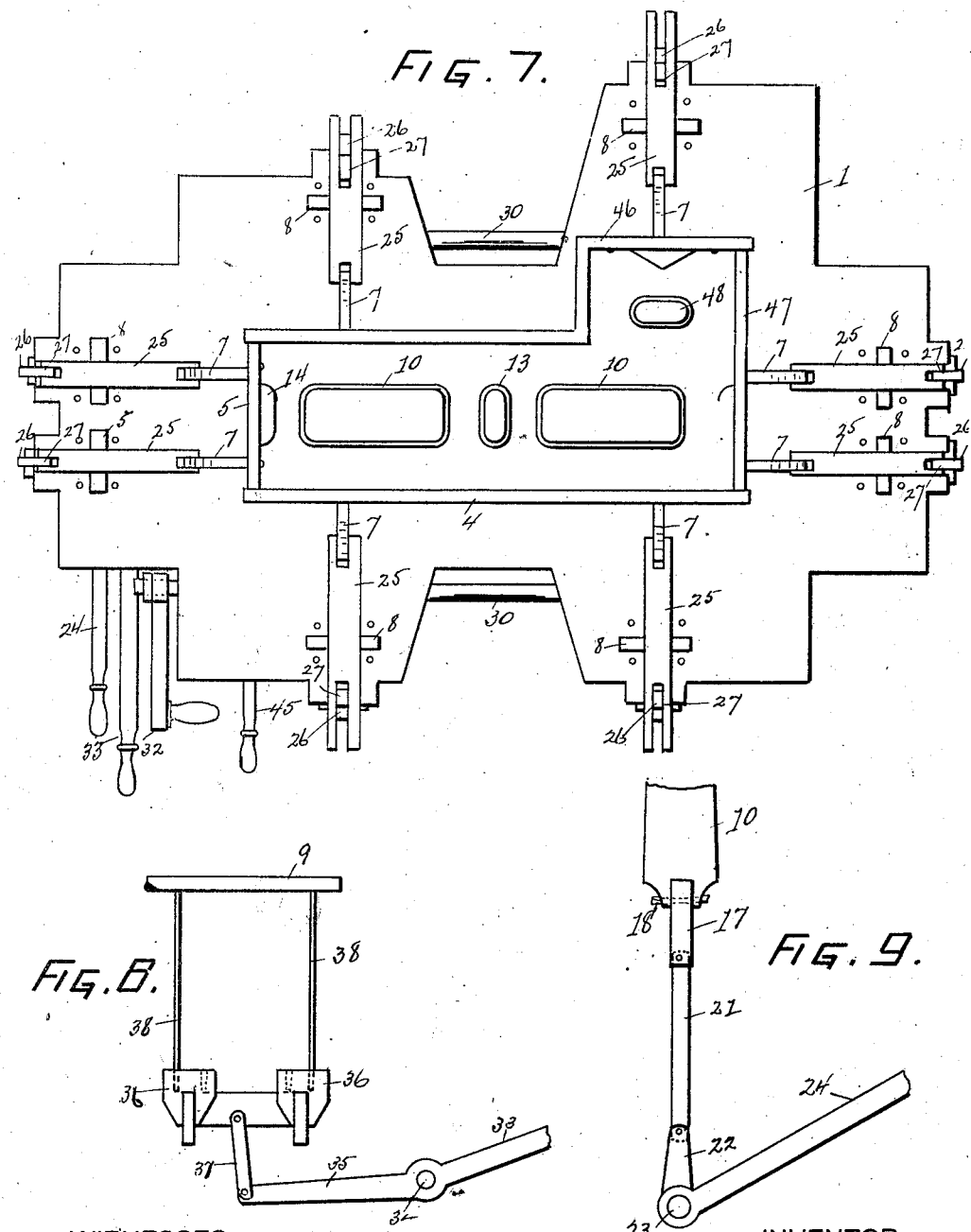

No. 762,937.

Patented June 21, 1904.

UNITED STATES PATENT OFFICE.

WARREN F. PEELER, OF JACKSON, MICHIGAN.

MACHINE FOR MAKING CEMENT BLOCKS.

SPECIFICATION forming part of Letters Patent No. 762,937, dated June 21, 1904.

Application filed February 21, 1903. Serial No. 144,543. (No model.)

*To all whom it may concern:*

Be it known that I, WARREN F. PEELER, a citizen of the United States, residing at the city of Jackson, in the county of Jackson and State of Michigan, have invented certain new and useful Improvements in Machines for Molding Cement Blocks, of which the following is a specification.

My invention relates to those classes of machines in which a moldboard and a mold are assembled and the block of cement is molded within the same; and the objects of my said improvements are, first, to provide means to quickly and accurately assemble and disassemble the sides forming said mold; second, to provide means for withdrawing the core from said mold a predetermined distance; third, to provide means for easily, quickly, and safely removing the formed cement block from said mold; fourth, to provide a mold that may be easily and quickly adjusted for different sizes of blocks; fifth, to provide a mold which may be altered quickly to make L-shaped blocks for corner uses, other benefits and advantages being apparent from the following description.

Figure 1:
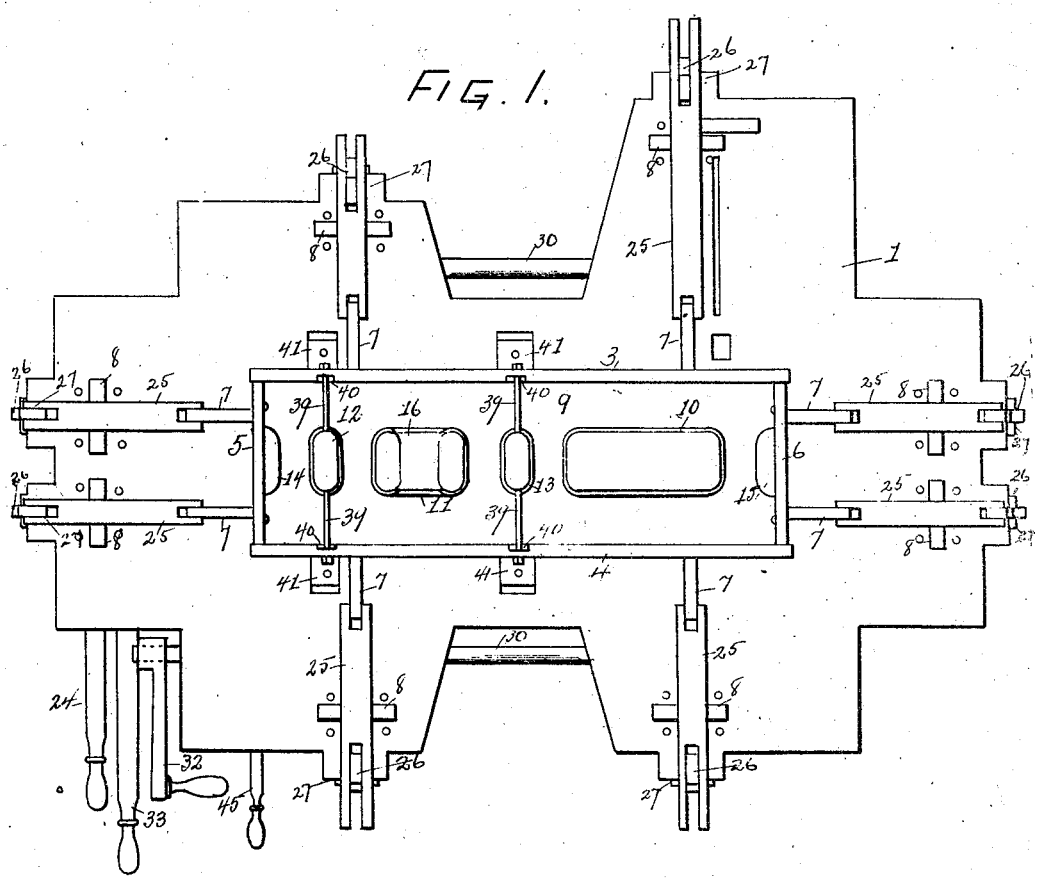
Figure 2:
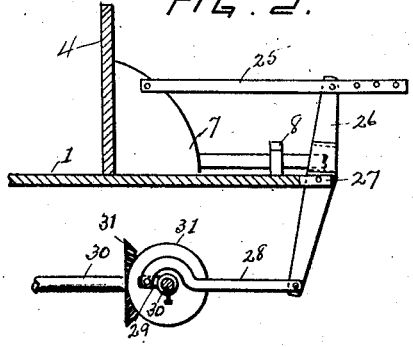
Figure 3:
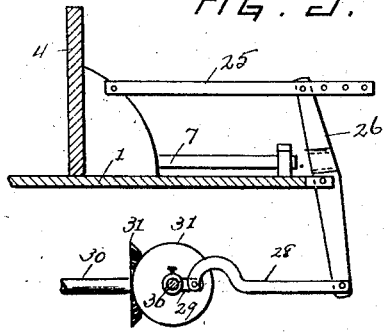

In the drawings forming part of this specification, and in which like numerals of reference refer to similar parts, Figure 1 is a top plan view of my machine as adjusted for forming blocks or parts of blocks. Fig. 2 is a detail view of the means employed to advance the sides and ends and shows the position of the mechanism when the mold is closed for use. Fig. 3 is another detail view of the same mechanism shown in Fig. 2, showing the mold open for removal of the molded blocks. Fig. 4 is an end elevation from the left-hand side as shown in Fig. 1. Fig. 5 is a detail view of the rods and bevel-gears employed for simultaneously assembling and disassembling the sides and ends of the mold. Fig. 6 is a detail view of the split pins employed when the block is to be divided into two or more short blocks. Fig. 7 is a view similar to Fig. 1, showing the parts arranged to form a corner-block. Fig. 8 shows the mechanism for raising the block out of the mold. Fig. 9 shows the means employed to lower the core after the cement block is molded. Fig. 10 is a section view of the mold, showing the means employed to withdraw the split pins from contact with the molded block.

In the drawings shown herewith, 1 is the bed-plate, upon which the other parts are mounted, and is supported at a suitable height for convenience by means of the legs 2 2 2 2. Mounted upon the top of said bed-plate 1 are the sides of my mold 3 and 4 and the ends of my mold 5 and 6. Each of said sides and ends is slidably mounted upon said bed-plate, so that it may be advanced toward the center of said mold or retracted therefrom. To accomplish this result, each of said side and end pieces has an extension 7 attached thereto, which slides backward and forward through the guides 8. On the under side of each of said extensions 7 is one or more screws passed through slots cut in the bed-plate, and these said screws retain said side and end pieces upon said bed-plate and also guide said side and end pieces as they are moved forward and backward, as hereinafter described. In the rectangular space formed between the sides and ends of said mold 3, 4, 5, and 6 I place the moldboard 9. This board is of the same size as the cement block to be molded, and the end and side pieces of said mold are moved up tightly against the same and held in position thereagainst during the molding operation, hereinafter described. In this moldboard 9 are openings of the size of the base of the cores intended to be used therewith, as 10, 11, and 12 in the drawings, Fig. 1, the said moldboard being adapted to be raised up beyond the tops of said cores when the block is being removed therefrom. The cores may be of any of the shapes shown in Fig. 1, as 10, 11, or 12. The core 10, as shown therein, is of a suitable size for molding a block of half the length of said mold, while the core 11 would be used for molding a block one-fourth the size of said mold, and the core 12 would be employed when it was desired to mold a block one-eighth the size of said mold. The core 13 is employed as a center core, and it will be seen that whenever the mold is divided a core similar to this is employed, and the block is divided on a line with the middle thereof, taking one-half of the size of said core out of the end of each of said blocks for convenience and facility in dividing and laying said blocks. In the same manner the cores 14 and 15 (which are attached, preferably, to the ends 5 and 6) form openings of the same size in each end of the block molded. The cores 10, 11, 12, and 13 are tapered from the bottom toward the top to permit of being drawn from the under side of said block. These cores may be each made in a solid piece, as shown at 10, 12, and 13, which I prefer, or may for convenience in molding different-sized blocks be constructed of two or more cores the size and shape of the core 13, with a middle core, as 16, filling up the space between them, as shown in the core 11 in Fig. 1 of the drawings. Each of these middle cores 10, 11, 12, 13, and 16 is slotted on the under side to fit upon the support therefor, 17, and each of said cores and said support is bored to receive bolts 18 for attaching said cores to said support. The said support 17 extends the full length of the frame supporting said bed-plate, and the ends thereof are mounted in slideways 19 in the ends 20 in said frame to permit said support to slide upward and downward through a predetermined distance. The upper portion of said support projects up through a slot cut in the bed-plate and a suitable distance above said bed-plate to permit attachment of the cores, as above set forth. To move said support up and down, it is connected, by means of two or more connecting-bars 21 21, which are pivotally connected therewith, with arms 22 22, attached to the shaft 23, mounted in bearings in said frame. To operate said shaft when desired to raise and lower said support and the cores mounted thereon, it is provided with the lever 24. The object of this construction is to raise the cores to a suitable elevation within the mold while the cement block is being made, and after the cement block is properly tamped the lever is lowered until the cores are withdrawn a sufficient distance to be out of contact with the said molded cement block, when the cement block is raised and removed, as hereinafter described.

To assemble the sides and ends of the mold ready for molding the cement block, the said sides and ends have pivotally connected therewith the rods 25. These rods are pivotally and adjustably connected with the levers 26, which are mounted in slots in the bed-plate at 27, as shown. At the lower extremities of said levers are attached pivotally the rods 28, which are preferably made with the curved portion, as shown, and are pivotally attached to the ends of the arms 29, which are in turn attached to the shafts 30. The shafts 30 are mounted in bearings attached to the frame and carry the bevel-gears 31, as shown, so mounted that each bevel-gear is in mesh with the adjacent bevel-gear upon the adjacent shaft. On the end of one of the shafts I have placed the handle 32, and by turning this handle a half-revolution this shaft to which it is attached is turned a half-revolution, and through the bevel-gears each of the other shafts is turned a half-revolution. As the shafts are thus rotated by means of the arms 29, levers 26, and rods 25 and 28 the ends and sides of the mold are by the one movement uniformly advanced to the moldboard 9, or by rotating the handle in the opposite direction the said sides and ends may be withdrawn from said moldboard 9 to permit removal of the cement block after having been formed.

In my said machine to remove the formed cement block I have arranged to raise the cement block and the moldboard, or "dry plate," as it is sometimes called, above the top edges of the sides and ends of the mold and above the top of the core, when the block may be easily and quickly removed without the danger of injury from contacting with the mold in removal. To accomplish this purpose, I employ a lever 33, attached to the end of the shaft 34, mounted in suitable bearings in the frame. Attached to this shaft are one or more arms 35, and connecting this arm 35 with the blocks 36 I employ the connecting rod or strap 37. Into holes in the upper side of said blocks 36 are loosely mounted the pins 38, which project through holes in the bed-plate and rest in contact with the under side of the moldboard. Whenever it is desired to raise the cement block, the lever 33 is pushed downward, and by means of the shaft 34, the arm 35, the connecting-strap 37 the blocks are raised, and with them the pins and the moldboard and cement block resting thereon.

It is desirable that a machine of the class described be capable of molding different thickness of blocks, and to accomplish this purpose the moldboard is inserted of the desired thickness, and the pivot connecting the rods 25 with the levers 26 are adjusted to the proper holes for the size to be molded, and if found necessary the guides 8 may also be adjusted backward or forward upon said bed-plate for the different sizes. It is also apparent that the cores may be removed and other sizes inserted when required for different sizes of blocks. By this means by a very slight adjustment of my said machine I am able to mold cement blocks of all the different sizes ordinarily required in building.

It is also desirable in a machine for molding cement blocks that it be capable of molding blocks of one-half, one-quarter or, some other aliquot part of the whole. To accomplish this purpose, I employ the blades 39, attached to the sides of the mold and extending inwardly to the cores, as shown. By this means the block is divided into as many parts desired. When the side walls of the mold are withdrawn, the blades are also withdrawn from the cement block and leave them free to be removed, as described above. To obviate any injury that may occur to the stone, as by crumbling when the blades are being withdrawn, I employ a split pin 40, mounted in a recess in a side wall, as shown, and having the blade 39 in the opening formed in said pin. At its lower extremity said pin is mounted in the sliding member 41, suitably mounted in sideways provided in the surface of the bed-plate, the slideways on the opposite sides being connected by the connecting-bars 42 43 44 and operated by the lever 45, mounted upon the shaft 46, passing through and connecting the bars 44. By this construction the side portions of the split pin 40 remain in contact with the cement block while the side walls and blades of said mold are being withdrawn, and thus prevent any danger of crumbling at the corners. After the sides and blades have been withdrawn by operating the lever 45 the said split pins are withdrawn from contact with the block, and the blocks are free to be removed from said mold.

It is also desirable that the machine be capable of producing corner-blocks made in the shape of the letter L, and to accomplish this purpose I substitute in lieu of one of the sides, as 3, a side of the proper shape for forming the corner-block, as 46. Also a longer end piece, as 47, is substituted in place of the end piece 6, and an additional core, as 48, is inserted, if desired. To obviate any liability of injuring the block when the side 46 is being withdrawn, the grooves in which said side is slid forward and backward are made at an angle, as shown, so that the side is drawn away from the block at all points. To facilitate the adaptation of said machine to different sizes and shapes of blocks, the guides 8 are removably attached to the bed-plate, and the pins 38 are loosely mounted and may be changed to other holes in the blocks supporting them and in the bed-plate to adjust them to other or different sizes or shapes of blocks.

In the operation of my said machine the sides and cores are adjusted for the size and shape of block to be molded, and the sides and ends are advanced until they are in contact with the moldboard. The cement is placed inside the mold and properly tamped. When the block is considered to be in suitable condition for removal, the cores are lowered, by means of the lever 24, until they are out of contact with the block, the sides and ends are withdrawn by means of the handle 32, and the block is raised above the top of the said sides and ends by means of the lever 33, when it may be readily lifted off from the said pins 38 and carried away upon the moldboard, o "dry plate," as it is sometimes called, to set and another moldboard is placed in the machine for the next operation.

Having thus described my said machine, what I claim, and desire to secure by Letters Patent, is the following:

1. In a machine for molding plastic material, the combination with a bed having an opening therein, of a dry plate mounted upon the bed over said opening, said dry plate having an opening therein, a mold having separable sides and ends, means for moving the sides and ends toward and away from the dry plate, a core, a support for the core, said support being arranged beneath the bed and extending longitudinally throughout the length thereof, means for pivotally mounting the support, means for raising and lowering the support bodily in a vertical plane, means for limiting the upward movement of said support, and means for elevating the dry plate above the upper edges of the mold.

2. In a machine for molding plastic material, the combination with a bed, having an opening therein, of a dry plate mounted upon the bed over said opening, said dry plate having an opening therein, a mold having separable sides and ends, means carried by said sides for dividing the mold into separate compartments, means for moving the sides and ends toward and away from the dry plate simultaneously with a portion of said dividing means, separate means for moving the other portion of the dividing means, means for raising and lowering the core through the opening in the bed and dry plate and means for elevating the dry plate above the upper edges of the mold.

3. In a machine for molding plastic material, the combination with a bed having an opening therein, of a dry plate mounted upon the bed over said opening, the dry plate having an opening therein, a mold having separable sides and ends, means for moving the sides and ends toward and away from the dry plate, a core having a bifurcated lower end, a pivotally-mounted support for the core, the bifurcated end of the core straddling its support and secured thereto, means for raising and lowering the support bodily in a vertical plane and simultaneously raising and lowering the core through the opening in the bed and dry plate, and means for lifting the dry plate above the upper edges of the mold.

4. In a machine for molding plastic material, the combination with a bed, of a dry plate mounted thereon, a mold having separable sides and ends, a core arranged within the mold, means coöperating with the mold and the core to form separate compartments of the former, means for moving a portion of said coöperating means simultaneously with a movement of the sides of the mold, and separate means for moving the remaining portion of said coöperating means from the plastic material.

5. In a machine for molding plastic material, the combination with a bed, of a dry plate, a mold having separable sides and ends, each member of the sides and ends of the mold having an extension, a core having a bifurcated end, a support for the core, the bifurcated end of the core straddling its support and secured thereto, means for pivotally mounting the support, and means connected with the extension of the sides and ends of the mold for moving them toward and away from the dry plate.

6. A cement mold formed of removable sides and ends, detached one from another; a gear mechanism connected with said sides and ends for simultaneously advancing said sides and ends; a removable dry plate having openings therein; cores mounted upon a movable support within said openings; blades extending from the sides of said mold to said cores, and split pins disposed with their members upon either side of said plates with means for advancing and withdrawing said split pins from said mold.

7. In a device of the class described, a cement mold consisting of a bed-plate; detached sides and ends slidably mounted upon said bed-plate; in grooves thereon, guides for retaining said sides and ends upon said bed-plate; gear mechanism connected with said sides and ends for moving them forward and backward; a removable dry plate disposed within the space formed by said sides and ends and having openings therein; cores mounted in said openings, upon movable supports; a lever mechanism connected with said support for raising and lowering the same; pins disposed beneath said dry plate, with lever means for raising said pins and said dry plate; blades attached to the sides of said mold, and extending to said cores, when the mold is closed; split pins disposed upon either sides of said blades, and lever mechanism connected with said pins for simultaneously withdrawing said pins from contact with the molded block, substantially as shown and described.

8. In a machine for molding plastic material, the combination with a bed, of a dry plate mounted upon the bed, a mold having separable sides and ends, a core arranged within the mold, means carried by the sides of the mold for coöperation with the core to form separate compartments therein, means for moving the sides and ends of the mold, means for moving the core, and means for moving the dry plate.

9. In a machine for molding plastic material, the combination with a bed, of a dry plate mounted upon the bed, a mold, a core arranged within the mold, means carried by the latter for coöperation with the core to form separate compartments, means for moving a portion of said coöperation means independently of the other portion thereof, means for moving the core, and means for moving the dry plate.

10. In a machine for molding plastic material, the combination with a bed having an opening therein, of a dry plate mounted upon the bed over said opening, said dry plate having an opening therein, a mold having separable sides and ends, means for moving the sides and ends toward and away from the dry plate, a core, a pivotally-mounted support for the core, said support being vertically movable, means constructed and arranged to reciprocate the core, and means for elevating the dry plate above the upper edges of the mold.

WARREN F. PEELER.

In presence of—
   CHESTER W. BROWN,
   C. E. BROWN.